United States Patent
Agrawal et al.

(10) Patent No.: US 12,254,265 B2
(45) Date of Patent: Mar. 18, 2025

(54) GENERATING UNIQUE WORD EMBEDDINGS FOR JARGON-SPECIFIC TABULAR DATA FOR NEURAL NETWORK TRAINING AND USAGE

(71) Applicant: International Business Machines Corporation, Armonk, NY (US)

(72) Inventors: Bhavna Agrawal, Armonk, NY (US); Elham Khabiri, Briarcliff Manor, NY (US); Yingjie Li, Chappaqua, NY (US); Pranav Girish Sankhe, Buffalo, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/483,989

(22) Filed: Sep. 24, 2021

(65) Prior Publication Data

US 2023/0097150 A1   Mar. 30, 2023

(51) Int. Cl.
*G06F 40/18* (2020.01)
*G06F 40/284* (2020.01)
*G06N 3/047* (2023.01)
*G06N 3/08* (2023.01)

(52) U.S. Cl.
CPC ............ *G06F 40/18* (2020.01); *G06F 40/284* (2020.01); *G06N 3/047* (2023.01); *G06N 3/08* (2013.01)

(58) Field of Classification Search
CPC ..... G06F 40/18; G06F 40/284; G06N 3/0472; G06N 3/08
USPC ........................................................ 715/212
See application file for complete search history.

(56) References Cited

U.S. PATENT DOCUMENTS

| | | | |
|---|---|---|---|
| 6,169,990 B1 | 1/2001 | McGregor | |
| 6,470,306 B1 | 10/2002 | Pringle | |
| 7,664,759 B2 | 2/2010 | Alexandrescu | |
| 7,777,125 B2 | 8/2010 | Platt et al. | |
| 7,966,174 B1* | 6/2011 | Bangalore | G06K 9/6282 704/231 |
| 9,911,003 B2 | 3/2018 | Farkash et al. | |
| 10,229,154 B2 | 3/2019 | Byron et al. | |
| 10,394,803 B2 | 8/2019 | Bordawekar | |
| 10,657,332 B2 | 5/2020 | Zhang et al. | |
| 10,817,657 B2 | 10/2020 | Akyamac et al. | |
| 2005/0027717 A1 | 2/2005 | Koudas | |

(Continued)

OTHER PUBLICATIONS

Arik, Sercan O. et al., "TabNet: Attentive Interpretable Tabular Learning", arXiv preprint arXiv:1908.07442, 2019, 9 pgs.

(Continued)

*Primary Examiner* — Stephen S Hong
*Assistant Examiner* — Tionna M Burke
(74) *Attorney, Agent, or Firm* — Anthony M. Pallone

(57) ABSTRACT

Tabular data is accessed that contains multiple entries of alphanumeric data. Multiple tokens are generated of the multiple entries of alphanumeric data using a tokenization process. The tokenization process maintains jargon-specific features of the alphanumeric data. Multiple embeddings of the multiple entries of alphanumeric data are generated using the tokens. The embeddings capture similarity of the multiple entries considering all of global features, column features, and row features in the tokens of the tabular data. A neural network is used to predict probabilities for predefined classes for the tabular data using the generated embeddings.

18 Claims, 5 Drawing Sheets

| Tokenization | Tokenization Output | | |
|---|---|---|---|
| Text (Corpus) | ABN29D | ABSENT2 | ABHINAV |
| Alpha-Numeric | ABN, 29, D | ABSENT, 2 | ABHINAV |
| BPE | AB, N29D | AB, SENT2 | AB, HINAV |
| Cell-Masking | ABN**D, 29 | ABSENT*, 2 | ABHINAV |

(56) References Cited

U.S. PATENT DOCUMENTS

| | | | |
|---|---|---|---|
| 2006/0100974 | A1 | 5/2006 | Dieberger et al. |
| 2008/0059152 | A1 | 3/2008 | Fridman et al. |
| 2008/0082834 | A1* | 4/2008 | Mattsson ............ G06F 12/1408 |
| | | | 715/765 |
| 2009/0164427 | A1 | 6/2009 | Shields |
| 2010/0312769 | A1 | 12/2010 | Bailey |
| 2011/0125578 | A1 | 5/2011 | Alspector |
| 2015/0052084 | A1 | 2/2015 | Kolluru |
| 2017/0286398 | A1 | 10/2017 | Hunt et al. |
| 2017/0300471 | A1 | 10/2017 | Simske et al. |
| 2020/0089769 | A1 | 3/2020 | Crossley et al. |
| 2020/0118555 | A1 | 4/2020 | Copeland |
| 2020/0175390 | A1* | 6/2020 | Conti .................. G06F 11/3672 |
| 2020/0210520 | A1* | 7/2020 | Akyamac ............... G06N 5/046 |
| 2021/0182476 | A1* | 6/2021 | Cervelli ................ G06F 16/215 |
| 2022/0309087 | A1* | 9/2022 | Müller .................. G06F 40/143 |

OTHER PUBLICATIONS

Bahdanau, Dzmitry, et al., "Neural Machine Translation By Jointly Learning To Align And Translate", ICLR 2015, arXiv:1409.0473v7 [cs.CL], May 19, 2016, 15 pgs.

Chen, Jiaoyan, et al., "Learning Semantic Annotations for Tabular Data", arXiv:1906.00781v1 [cs.DB], May 30, 2019, 7 pgs.

Deng, Li, et al., "Table2Vec: Neural Word and Entity Embeddings for Table Population and Retrieval", Short Research Papers 2A:AI, Mining, and others, SIGIR '19, Jul. 21-25, 2019, 4 pgs.

Devlin, Jacob, et al., "BERT: Pre-training of Deep Bidirectional Transformers for Language Understanding", Proceedings of NAACL-HLT 2019, pp. 4171-4186.

Efthymiou, Vasilis, et al., "Matching Web Tables with Knowledge Base Entities: From Entity Lookups to Entity Embeddings", International Semantic Web Conference, 2017, 16 pages.

Farrell, Tracie, et al., "On the use of Jargon and Word Embeddings to Explore Subculture within the Reddit's Manosphere", WebSci '20, Jul. 6-10, 2020, 10 pgs.

Ghasemi-Gol, Majid, et al., "TabVec: Table Vectors for Classification of Web Tables", Conference '17, Jul. 2017; arXiv:1802.06290v1 [cs.IR]) Feb. 17, 2018, 9 pgs.

Herzig, Jonathan, et al., "TAPAS: Weakly Supervised Table Parsing via Pre-training", ar:Xiv:2004.02349v2 [cs.IR], Apr. 21, 2020, 14 pgs.

Limaye, Girija, et al., "Annotating and Searching Web Tables Using Entities, Types and Relationships", PVLDB, 3:1338-1347, Sep. 2010.

Mikolov, Tomas, et al., "Efficient Estimation of Word Representation in Vector Space", ar:Xiv.1301.3781v3 [cs.CL], Sep. 7, 2013, 12 pgs.

Sennich, Rico, et al., "Neural Machine Translation of Rare Words with Subword Units", ar:Xiv:1508.07909v5 [cs.CL}, Jun. 10, 2016, 11 pgs.

Sun, Baohua, et al., "SuperTML: Two-Dimensional Word Embedding for the Precognition on Structured Tabular Data", Proceedings of the IEEE/CVF Conference on Computer Vision and Pattern Recognition (CVPR) Workshops, 2019, 9 pgs.

Sutskever, Ilya, et al., "Sequence to sequence Learning with Neural Networks", ar:Xiv:1409.3215v3 [cs CL], Dec. 14, 2014, 9 pgs.

Ying, Pengcheng et al., "TaBert: Pretraining for Joint Understanding of Textual and Tabular Data", ACL 2010, arXiv:2005.08314v1 [cs.CL], May 17, 2020, 15 pgs.

Yu, Mo, et al., "Factor-based Compositional Embedding Models", NIPS Workshop on Learning Semantics, 2014, 5 pgs.

ISO 6346 Container Type Codes, https://datahub.io/core/iso-container-codes#data, Aug. 2021, 14 pgs.

Bhagavatula et al., "TabEL: entity linking in web tables", International Semantic Web Conference, 2015, 425—441, Springer, <http://iswc2015.semanticweb.org/sites/iswc2015.semanticweb.org/files/93660385.pdf>, 16 pages.

Mulwad et al., "Semantic Message Passing for Generating Linked Data from Tables", 12th International Semantic Web Conference, Sydney, Oct. 2013, 19 pages.

Mulwad et al., "Using linked data to interpret tables", Proceedings of the the First International Workshop on Consuming Linked Data, 2010, <https://ebiquity.umbc.edu/_file_directory_/papers/524.pdf>, 12 pages.

Pham et al., "Semantic labeling: a domain-independent approach", International Semantic Web Conference, 2016, 446—462, Springer, <https://usc-isi-i2.github.io/papers/pham16-iswc.pdf>, 16 pages.

Ren et al., "Likelihood Ratios for Out-of-Distribution Detection", 33rd Conference on Neural Information Processing Systems (NeurIPS 2019), Vancouver, Canada, arXiv:1906.02845v2 [stat. ML] Dec. 5, 2019, 21 pages.

Takeoka et al., "An efficient probabilistic approach for semantically annotating table", The Thirty-Third AAAI Conference on Artificial Intelligence (AAAI-19), 2019, 8 pages.

Venetis et al., "Recovering semantics of tables on the web", Proceedings of the VLDB9, vol. 4, Issue 9, 11 pages, Published Jun. 1, 2011, <https://doi.org/10.14778/2002938.2002939>.

J. Pennington et al.; "Glove: Global vectors for word representation"; In Proceedings of the 2014 Conference on Empirical Methods in Natural Language Processing, EMNLP 2014, Oct. 25-29, 2014, Doha, Qatar; A meeting of SIGDAT, a Special Interest Group of the ACL; pp. 1532-1543.

0. LEVY et al.; "Linguistic regularities in sparse and explicit word representations"; In Proceedings of the Eighteenth Conference on Computational Natural Language Learning, CoNLL, Baltimore, Maryland, USA; Jun. 26-27, 2014; pp. 171-180.

0. LEVY et al.; "Neural word embedding as implicit matrix factorization"; In Advances In Neural Information Processing Systems 27: Annual Conference on Neural Information Processing Systems, Montreal, Quebec, Canada; Dec. 8-13, 2014; pp. 2177-2185.

A. Mnih et al.; "Learning word embeddings effciently with noise-contrastive estimation"; In Advances in Neural Information Processing Systems 26: 27th Annual Conference on Neural Information Processing Systems 2013; Proceedings of a meeting held Dec. 5-8, 2013, Lake Tahoe, Nevada, United States; pp. 2265-2273.

Dreher et al ("Assisted query formulation using normalised word vector and dynamic ontological filtering", vol. 4027 LNAI, 2006, pp. 282-294, 7th International Conference on Flexible Query Answering Systems, FQAS 2006; Milan; Italy; Jun. 7, 2006 through Jul. 10, 2006; Code 67889).

S. Arora et al., "Random Walks on Context Spaces: Towards an Explanation of the Mysteries of Semantic Word Embeddings", arXiv:1502.03520v3 [cs.LG] Apr. 21, 2015, 28 pages.

S. Arora et al.; "Rand-Walk: A latent variable model approach to word embeddings"; arXiv:1502.03520v5 [cs.LG] Oct. 14, 2015, 23 pages.

T. Mikolov et al.; "Distributed representations of words and phrases and their compositionality"; In Advances in Neural Information Processing Systems 26: 27th Annual Conference on Neural Information Processing Systems 2013; Proceedings of a meeting held Dec. 5-8, 2013, Lake Tahoe, Nevada, United States; pp. 3111-3119.

T. Mikolov et al.; "Exploiting similarities among languages for machine translation"; CoRR, abs/1309.4168; 2013; whole document (10 pages).

T. Mikolov; "word2vec: Tool for computing continuous distributed representations of words"; https://code.google.com/p/word2vec; 2015; whole document (4 pages).

Y. Bengio et al.; "A neural probabilistic language model"; Journal of Machine Learning Research, 3; 2003; pp. 1137-1155.

\* cited by examiner

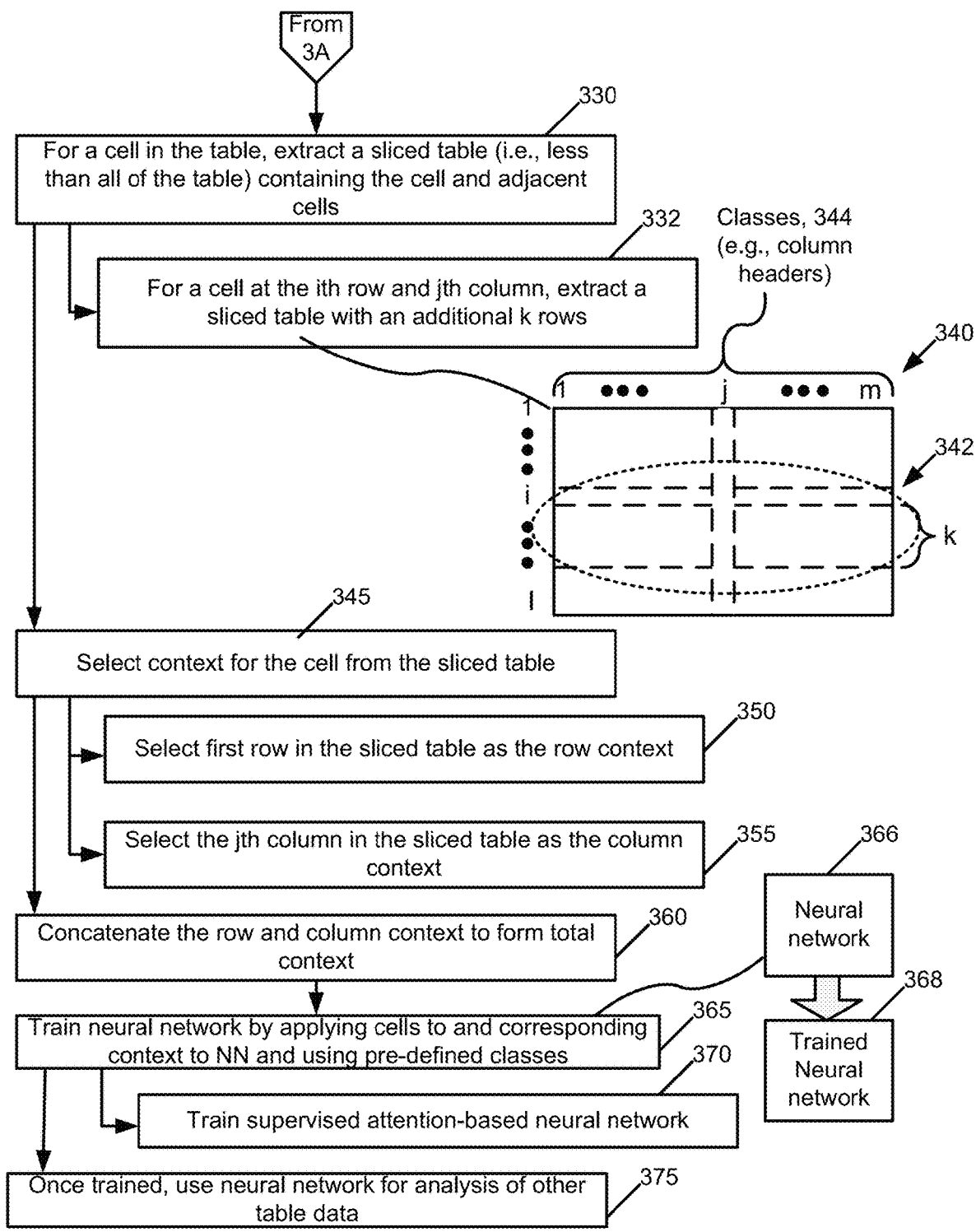

| Tokenization | Tokenization Output | | |
|---|---|---|---|
| Text (Corpus) | ABN29D | ABSENT2 | ABHINAV |
| Alpha-Numeric | ABN, 29, D | ABSENT, 2 | ABHINAV |
| BPE | AB, N29D | AB, SENT2 | AB, HINAV |
| Cell-Masking | ABN**D, 29 | ABSENT*, 2 | ABHINAV |

FIG. 4

GENERATING UNIQUE WORD EMBEDDINGS FOR JARGON-SPECIFIC TABULAR DATA FOR NEURAL NETWORK TRAINING AND USAGE

BACKGROUND

This invention generally relates to analysis of tabular information and, more specifically, relates to generating unique word embeddings for jargon-specific tabular data for neural network training and usage.

Enterprises often have a large number of databases and other sources of tabular data with columns full of domain-specific jargon, which usually requires domain experts to decode. For example, tabular data can contain columns full of domain-specific jargon such as the following: alphanumeric codes; undeclared abbreviations; and the like.

In addition, the annotation of this data is generally very sparse, and the same entity could be referred to by multiple column titles. Further, a large number of tables may be distributed over a large number of systems.

In order to process this data seamlessly across systems, and draw insights from this data, without having to match column headers by hand, it might be possible to apply deep learning techniques (or other techniques) to suggest the column names based on analysis of column content by these deep learning techniques. However, due to the jargon-specific content of the tables, no pre-trained language models can be applied readily to encode the cell semantics. This makes it challenging to tokenize and create embeddings for the tabular data. And, therefore, to provide useful outputs.

SUMMARY

This section is meant to be exemplary and not meant to be limiting.

An exemplary method is disclosed of using a computing device to generate unique word embeddings for jargon-specific tabular data. The method includes accessing by a computing device tabular data containing a plurality of entries of alphanumeric data. The method includes generating, by the computing device using a tokenization process, a plurality of tokens of the plurality of entries of alphanumeric data. The tokenization process maintains jargon-specific features of the alphanumeric data. The method includes generating, by the computing device using the tokens, a plurality of embeddings of the plurality of entries of alphanumeric data. The embeddings capture similarity of the plurality of entries considering all of global features, column features, and row features in the tokens of the tabular data. The method includes predicting, by the computing device with a neural network, probabilities for pre-defined classes for the tabular data using the generated embeddings.

In another exemplary embodiment, a computing device is disclosed that is used to generate unique word embeddings for jargon-specific tabular data. The computing device comprises one or more memories having computer-readable code thereon, and one or more processors/. The one or more processors, in response to retrieval and execution of the computer-readable code, cause the computing device to perform operations comprising: accessing by the computing device tabular data containing a plurality of entries of alphanumeric data; generating, by the computing device using a tokenization process, a plurality of tokens of the plurality of entries of alphanumeric data, the tokenization process maintaining jargon-specific features of the alphanumeric data; generating, by the computing device using the tokens, a plurality of embeddings of the plurality of entries of alphanumeric data, the embeddings capturing similarity of the plurality of entries considering all of global features, column features, and row features in the tokens of the tabular data; and predicting, by the computing device with a neural network, probabilities for pre-defined classes for the tabular data using the generated embeddings.

In a further exemplary embodiment, a computer program product is disclosed that comprises a computer readable storage medium having program instructions embodied therewith. The program instructions are executable by a computing device to cause the computing device to perform operations comprising: accessing by the computing device tabular data containing a plurality of entries of alphanumeric data; generating, by the computing device using a tokenization process, a plurality of tokens of the plurality of entries of alphanumeric data, the tokenization process maintaining jargon-specific features of the alphanumeric data; generating, by the computing device using the tokens, a plurality of embeddings of the plurality of entries of alphanumeric data, the embeddings capturing similarity of the plurality of entries considering all of global features, column features, and row features in the tokens of the tabular data; and predicting, by the computing device with a neural network, probabilities for pre-defined classes for the tabular data using the generated embeddings.

BRIEF DESCRIPTION OF THE SEVERAL VIEWS OF THE DRAWINGS

FIG. 3, which is spread over FIGS. 3A and 3B, is a logic flow diagram for generating unique word embeddings for jargon-specific tabular data for neural network training and usage in accordance with an exemplary embodiment; and FIG. 4 is a table illustrating results of tokenization for three different approached including an approach used herein in an exemplary embodiment.

DETAILED DESCRIPTION

Figure 1:
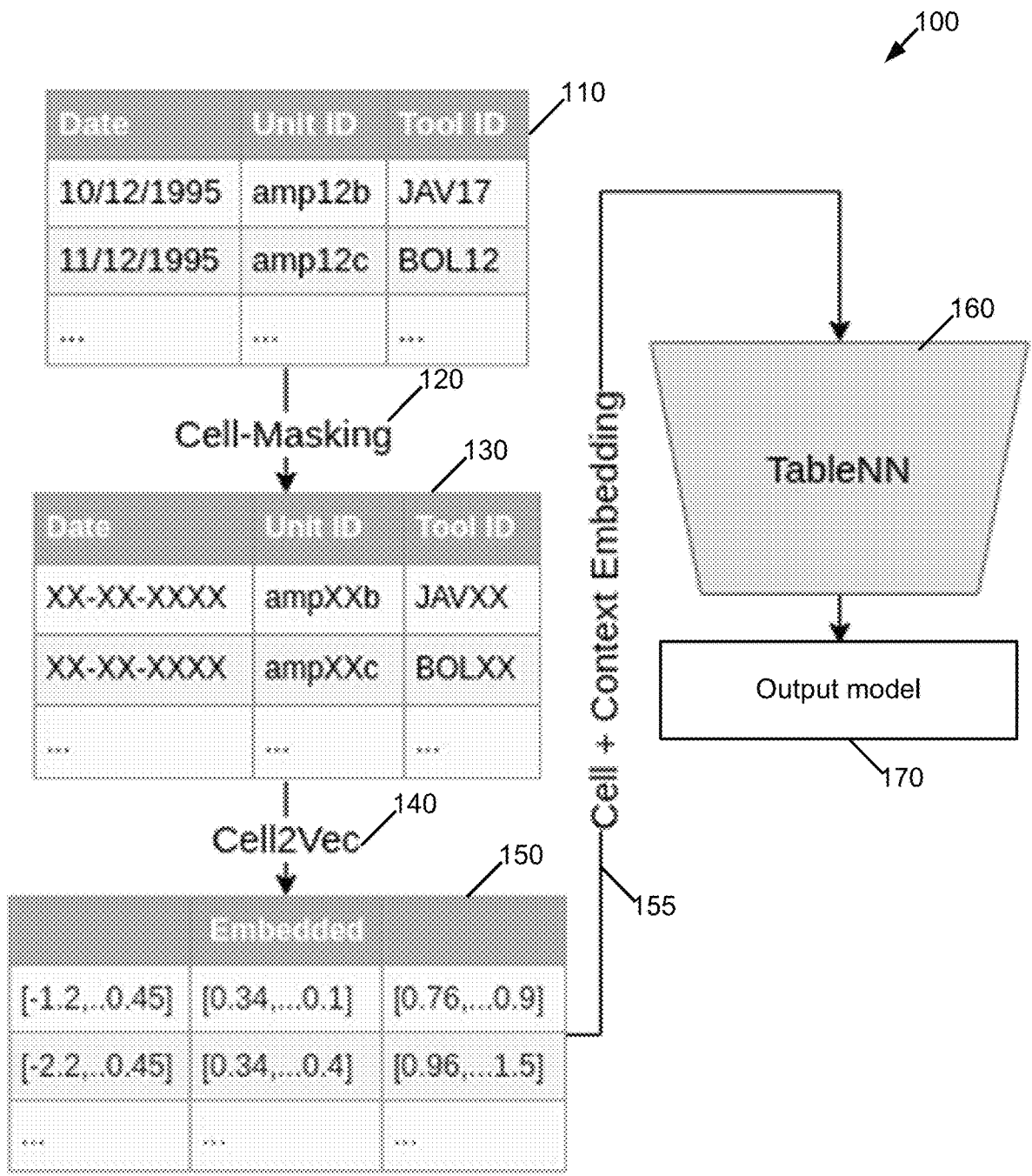
FIG. 1 is a block diagram of a framework for generating unique word embeddings for jargon-specific tabular data for neural network training and output in an exemplary embodiment.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

As previously described, tables are rich in data and can provide vital information about an object. Extracting useful insights from tabular data may require domain expertise, however, especially if the information is composed of domain-specific jargon or codes.

Tabular data may contain numerical data, categorical data, cohesive phrases with semantics, coded information, and the like, or a mix of these. Existing analysis methods rely on crucial assumptions regarding the type of data that the table may contain. These methods may be broadly categorized into two groups, depending on the type of data to which the method is applicable. There are methods that assume the data to be complete English phrases. See the following: Jiaoyan Chen, Ernesto Jimenez-Ruiz, Ian Horrocks, and Charles Sutton, "Learning semantic annotations for tabular data", arXiv preprint arXiv:1906.00781, 2019; and Vasilis Efthymiou, Oktie Hassanzadeh, Mariano Rodriguez-Muro, and Vassilis Christophides, "Matching web tables with knowledge base entities: From entity lookups to entity embeddings", in International Semantic Web Conference, 2017. These use pre-trained language models like Word2Vec to generate embeddings. Word2Vec is described in Tomas Mikolov, Kai Chen, Gregory S. Corrado, and Jeffrey Dean, "Efficient estimation of word representations in vector space", CoRR, abs/1301.3781, 2013. It is also possible to use entity labels associated with the cell text, as described in Girija Limaye, Sunita Sarawagi, and Soumen Chakrabarti, "Annotating and searching web tables using entities, types and relationships", PVLDB, 3:1338-1347, 09 2010.

On the other hand, the data can be assumed to be numerical or categorical. See Sercan O Arik and Tomas Pfister, "Tabnet: Attentive interpretable tabular learning", arXiv preprint arXiv:1908.07442, 2019. In the Arik et al. paper, the authors use raw numerical values as direct input, and generate embeddings for categorical data. However, the authors do not handle non-categorical tabular data.

While working with tables, exemplary methods herein should be invariant to column and row ordering. Column order invariance may be achieved by breaking down tables into slices and extracting context.

In order to address these issues, proposed methods herein work with any input data type, which the groups of work mentioned above cannot deal with. An overview is provided now, and more details are provided below.

With an exemplary proposed framework, the following three contributions may be included.

(1) Cell-Masking: A tokenization method that generalizes the cell entries in tabular data resulting in better quality embeddings and compressed vocabulary.

(2) Cell2Vec: A method to generate cell embedding by exploiting the row and column context.

(3) TableNN: A supervised attention-based neural network that predicts cell category while being column-order invariant.

Before proceeding with additional details, information about the technical area is presented. This information regards tokenization, embedding, and attention-based neural networks.

With respect to tokenization, this is an important and at times mandatory task while working with text data. Simply put, tokenization is breaking down the text into smaller chunks of text or tokens. These tokens make up the vocabulary for the model. Thus, the method used to generate these tokens is deemed important. In natural language applications, commonly used methods, such as word tokenization based on certain delimiters, character tokenization and sub-word tokenization, can provide reasonable results. However, they usually fail to encapsulate semantics in the way the text is tokenized.

More sophisticated methods such as byte pair encoding (BPE) provide a simple yet effective way to generate tokens according to the common subwords in a word corpus. For BPE, see Rico Sennrich, Barry Haddow, and Alexandra Birch, "Neural machine translation of rare words with subword units", ArXiv, abs/1508.07909, 2016. BPE is a data-driven, unsupervised, recursive method in which the most frequent pair of consecutive bytes are grouped together to form a new byte unit or tokens. However, the runtime is generally poor. While these methods are well suited for natural language applications, they fall short in handling alpha-numeric or coded data. Below, by contrast, an exemplary cell-masking method is described below that can converge faster than the existing tokenization method while achieving a balance between vocabulary size and runtime.

Concerning embedding, in different Natural Language Processing (NLP) applications such as classification, clustering and search, a word is represented by a vector. In more traditional approaches such as bag of word (BOW) and term frequency-inverse document frequency (TF-IDF), each vector entry is mapped to a word in the vocabulary, so that if a document contains that word, the related entry receives a non-zero value. The critical drawback for such representation is that the generated sparse vectors do not capture semantic similarity among the words. Word Embedding instead learns a dense vector from the surrounding context of each word, allows words with semantically similar meaning to have similar representations. For word embedding, see Tomas Mikolov, Kai Chen, Gregory S. Corrado, and Jeffrey Dean, "Efficient estimation of word representations in vector space", CoRR, abs/1301.3781, 2013.

At first, learning word representation was limited to unstructured data, until recent work proposed methods to learn representations in tables. For the recent work, see the following: Sercan O Arik and Tomas Pfister, "Tabnet: Attentive interpretable tabular learning", arXiv preprint arXiv: 1908.07442, 2019; Jiaoyan Chen, Ernesto Jiménez-Ruiz, Ian Horrocks, and Charles Sutton, "Learning semantic annotations for tabular data", arXiv preprint arXiv:1906.00781, 2019; Vasilis Efthymiou, Oktie Hassanzadeh, Mariano Rodriguez-Muro, and Vassilis Christophides, "Matching web tables with knowledge base entities: From entity lookups to entity embeddings", in International Semantic Web Conference, 2017; and Girija Limaye, Sunita Sarawagi, and Soumen Chakrabarti, "Annotating and searching web tables using entities, types and relationships", PVLDB, 3:1338-1347, 09 2010. For example, the Jiaoyan Chen et al. paper considers locality features that are extracted by application of convolution on the rows and columns surrounding the target cell. Although existing methods are useful when the cell entries have natural language meaning, they are not applicable when the cell entries have no obvious semantic meaning, and instead are just some form of domain-specific codes or jargon. Here, the instant exemplary embodiments use jargon for representations that might be specific for an organization, and perhaps not for the whole trade group/profession. An example is the following. A tool in manufacturing facility may be referred to as CVD005, but that will be specific to the particular company, and perhaps the 'CVD' phrase has some meaning for the company. However, another company may use completely different names, for similar contexts. To address this, exemplary methods are presented below to learn the representation of each cell entry in tabular datasets using the surrounding cells when the content of the cells is domain-specific.

Regarding attention-based neural networks, in word embedding, the representation of each word is learned from the surrounding context. The attention mechanism suggests that not only should the input words in the context be used, but also the relative importance of each term should be taken into account. For the attention mechanism, see Dzmitry Bandanau, Kyunghyun Cho, and Yoshua Bengio, "Neural machine translation by jointly learning to align and translate", arXiv preprint arXiv:1409.0473, 2014. The idea in Bandanau et al. has proven to be a breakthrough in many applications including text and image analysis. In this document, it is demonstrated that the idea is very effective when applied to tabular data by assigning relative importance to the surrounding cells in a table.

Now that information about the technical area has been presented, the exemplary embodiments are presented in more detail. Below, examples of three modules are described: (1) cell-masking for tokenizing cell entries; (2) learning vector representation of the masked cell entries using cell2vec; and (3) tabular learning method TableNN, using which cell entry classification tasks are performed.

Turning to FIG. 1, this figure is a block diagram of a framework 100 for generating unique word embeddings for jargon-specific tabular data for neural network training and output in an exemplary embodiment. There are three modules: cell-masking (or Cell-Masking) 120, corresponding to (1) above; cell2vec (or Cell2Vec) 140, corresponding to (2) above; and tableNN (or TableNN) 160, corresponding to (3) above.

In this example, a table 110 has columns of date, unit ID (identification), and tool ID. Only two rows of the table 110 are illustrated. The cell-masking module 120 operates on the table 110 to create table 130. The cell-masking module 120 is a tokenization method that generalizes the cell entries in tabular data. Tokenization is a process of breaking sentences into smaller pieces called tokens. Tokens are roughly equivalent to words, but not always, as described below. In this example, the numbers from the table 110 have been removed and replaced with "X" in the table 130.

The cell2vec module 140 uses the table 130 and generates cell embedding by exploiting the row and column context to create table 150. Each NLP (natural language processing) token is translated into a digital representation (e.g., a vector) of the word. Once there is a digital representation, there are a number of methods of determining similarity between the words, for instance cosine similarity as one metric. That is, where each word is mapped to a vector, the vector is learned in a way that captures characteristics of the word with respect to the overall text. This allows one to define words in this (e.g., vector) space such that similar words are closer to each other. For example, vector (King)—vector (Man)+vector (Woman)=vector (Queen) in this space. One may also find dissimilar words based on a metric.

The cell and context embedding 155 are used by the tableNN (where NN is neural network) module 160 to create a trained NN model 170. In particular, the tableNN module 160 may be a supervised attention-based neural network (as one example of a suitable NN) that predicts cell category while being column-order invariant. The trained NN is output via the output model 170 block.

Figure 2:
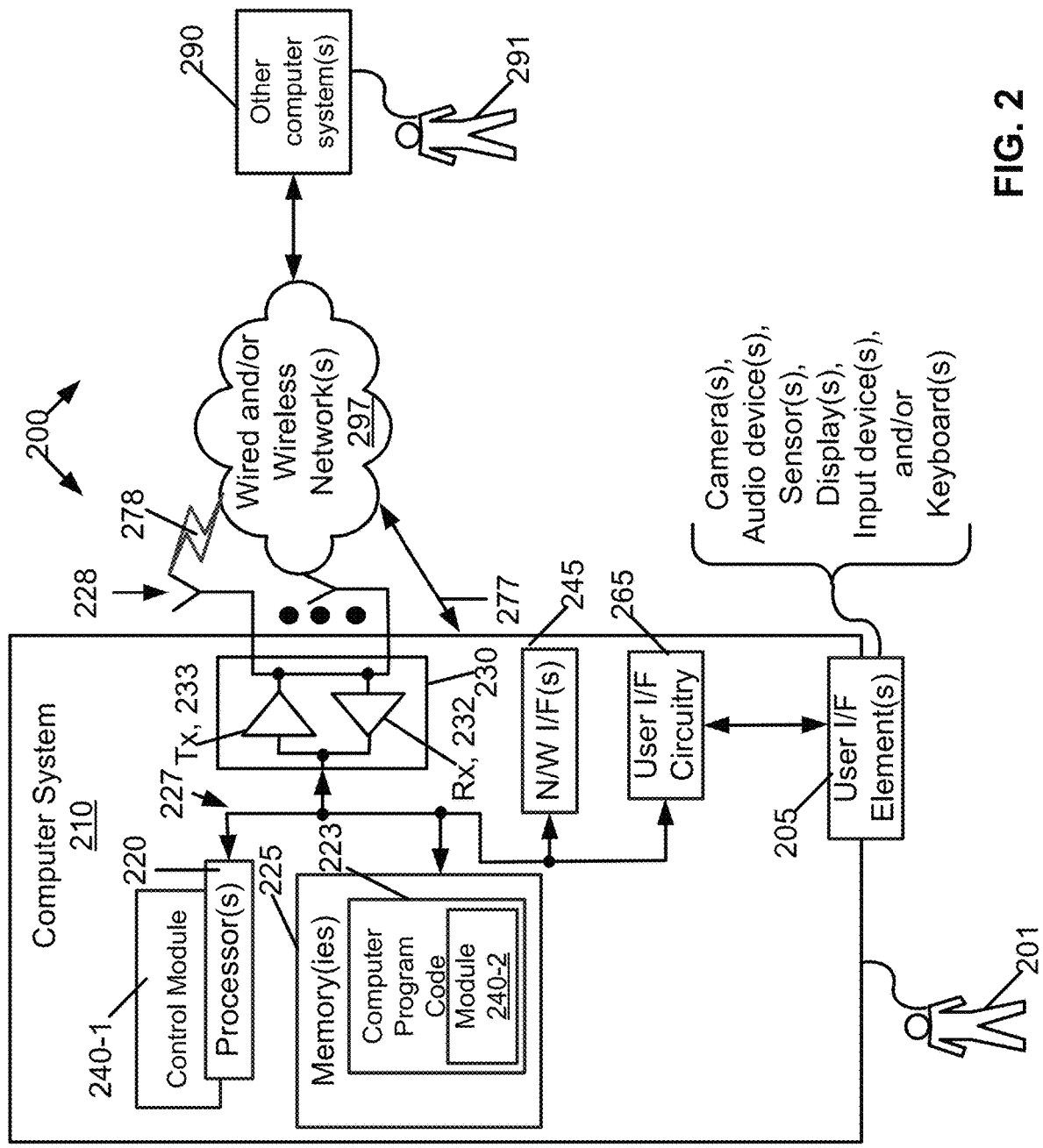
FIG. 2 is block diagram of an exemplary and non-limiting system for implementation of the framework of FIG. 1.

The modules 120, 140, and 160 and framework 100 are described in more detail below, after description of an exemplary system is described. Turning to FIG. 2, this figure is a block diagram of an exemplary and non-limiting system 200 for implementation of the framework of FIG. 1. The system 200 includes a computer system 210, one or more wired or wireless networks 297, and one or more other computer systems 290. The computer system 210 is a computing device suitable for performing the exemplary embodiments herein.

The computer system 210 includes one or more processors 220, one or more memories 225, one or more transceivers 230, one or more network (N/W) interfaces (I/F(s)), user interface (I/F) circuitry 265, and one or more antennas 228. The user interface circuitry 265 may interface with one or more user interface elements 205.

The one or more memories 225 include computer program code 223. The computer system 210 includes a control module 240, comprising one of or both parts 240-1 and/or 240-2, which may be implemented in a number of ways. The control module 240 may be implemented in hardware as control module 240-1, such as being implemented as part of the one or more processors 220. The control module 240-1 may be implemented also as an integrated circuit or through other hardware such as a programmable gate array. In another example, the control module 240 may be implemented as control module 240-2, which is implemented as computer program code 223 and is executed by the one or more processors 120. For instance, the one or more memories 225 and the computer program code 223 may be configured to, with the one or more processors 220, cause the computer system 210 to perform one or more of the operations as described herein. The control module 240 implements at least the cell-masking module 120, the cell2vec module 140, and the tableNN module 160 and can implement the framework 100 of FIG. 1.

The one or more transceivers 230 include one or more wireless receivers (Rx) 232 and one or more wireless transmitters (Tx) 233. The one or more transceivers 230 could be Bluetooth, NFC (near-field communication), Wi-Fi, satellite, cellular, or the like. These may interface with a wireless network 297, such as a Wi-Fi and/or cellular and/or satellite network, via one or more wireless links 278. The N/W I/F(s) 245 are wired interfaces that interface with a wired network 297, via one or more wired links 277.

In one example, a user (e.g., a human being) 201 interfaces with the computer system 210 via one or more of the user I/F elements 205, which can include camera(s), audio device(s) (such as speakers and/or microphones), display(s), input device(s) (such as mice or trackballs), and/or keyboards. The user I/F elements 205 could interface with the computer system 210 via the user I/F circuitry 265, such as via a USB (universal serial bus) or via other circuitry. Alternatively or additionally, the user I/F elements 205 could interface with the computer system 210 via the transceivers 230 such as via Bluetooth.

In another alternative or additional example, a user 291 uses one or more other computer systems 290 and interfaces with the computer system 210 and the control module 240 (and framework 100) via the wired or wireless networks 297. The computer system 210 could be on the Internet, in a LAN (local area network) or part of the cloud, for instance.

The computer readable memories 225 may be of any type suitable to the local technical environment and may be implemented using any suitable data storage technology, such as semiconductor-based memory devices, flash memory, firmware, magnetic memory devices and systems, optical memory devices and systems, fixed memory and removable memory. The computer readable memories 225 may be also means for performing storage functions. The processors 220 may be of any type suitable to the local technical environment, and may include one or more of general-purpose computers, special purpose computers, microprocessors, digital signal processors (DSPs) and processors based on a multi-core processor architecture, as non-limiting examples. The processors 220 may be means for performing functions, such as controlling the computer system 210, and other functions as described herein.

Figure 3A:
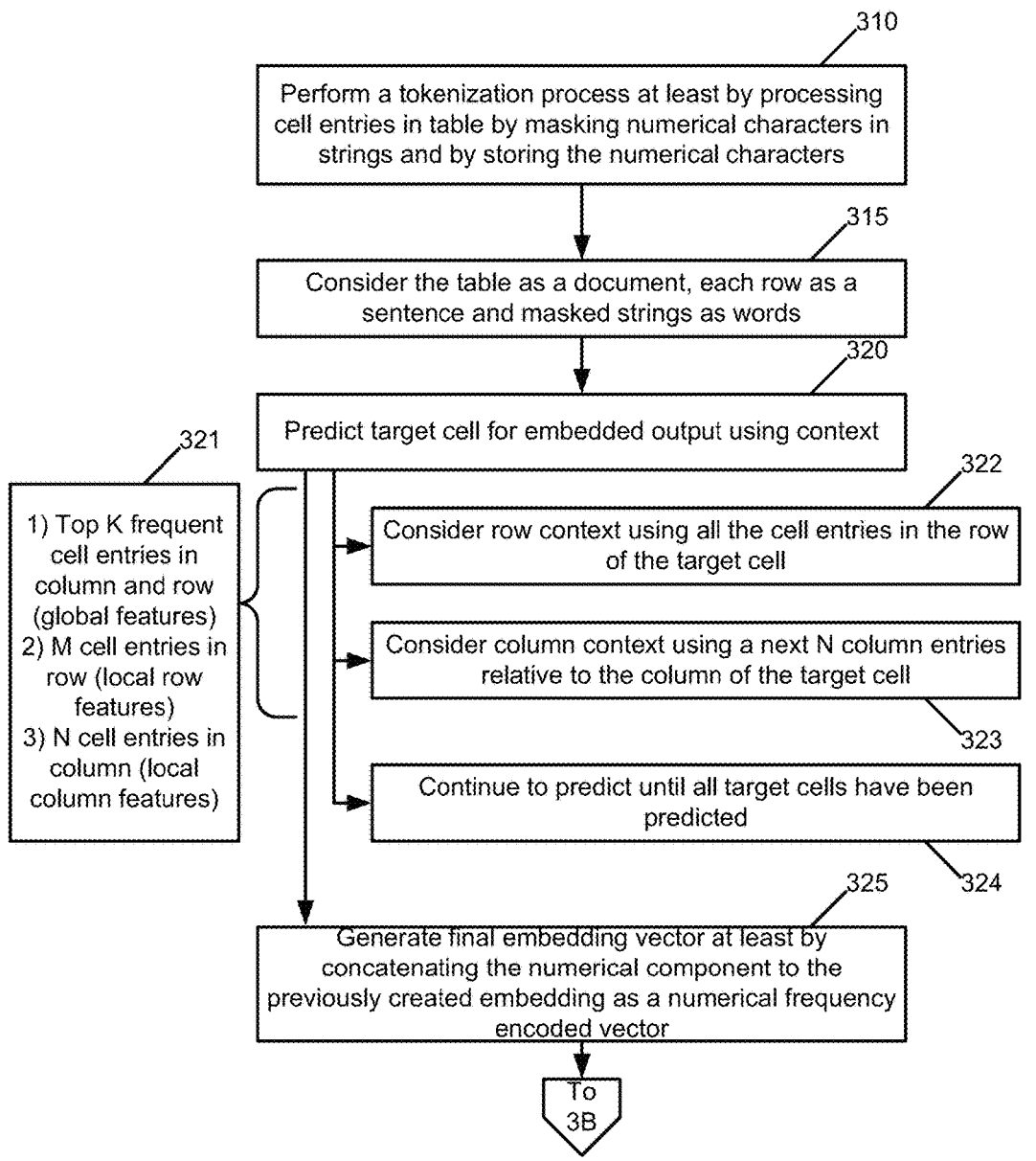

The modules 120, 140, and 160 and framework 100 are described in more detail now. The operations performed by these modules are described at least in part in reference to FIG. 3, which is spread over FIGS. 3A and 3B, and which is a logic flow diagram for generating unique word embeddings for jargon-specific tabular data for neural network training and output. This figure illustrates the operation of an exemplary method or methods, a result of execution of computer program instructions embodied on a computer readable memory, functions performed by logic implemented in hardware, and/or interconnected means for performing functions in accordance with exemplary embodiments. The blocks in FIG. 3 are assumed to be performed by the computer system 210, under control of the control module 240, which implements the framework 100 of FIG. 1.

For the cell-masking module 120 of FIG. 1, cell entries are processed by masking the numerical characters in the string, e.g., ABN29D is replaced with ABN**D, with the numerical part stored separately for later use for numerical frequency. See block 310 of FIG. 3, where the computer system 210 processes cell entries in a table by masking numerical characters in strings and by storing the numerical characters. Such an approach is considered appropriate for tabular data because often times, the actual numbers are important enough to not to ignore them completely, but the minor variations between them may not be very important. One of the features is this maintains correlation between similar words. Consider this example: NBA_2 K12 and NBA_2 K13 may be tokenized as NBA_*K**. One reason for this is the characters of NBA_*K** may have a particular connotation within the organization, such as a product line. The numbers, meanwhile, may have less importance, such as a version of the product line. This also works exceedingly well when working with 'date' data.

These masked entries form a vocabulary and are then used to generate an embedding. See table 130 of FIG. 1. It is noted that an asterisk (*) is used for some examples, while an "X" is also described for the replacement character (as in table 130). These are examples and other replacement characters may be used.

The table in FIG. 4 shows the results of tokenization using three difference approaches. That is, FIG. 4 is a table illustrating results of tokenization for three different approached including an approach used herein in an exemplary embodiment. The first row is text (corpus), indicating the starting point. This row is a sample row from a model attendance record of a school with the following cell entries: [Student ID, PRESENT/ABSENT(absentees), STUDENT NAME]. The student ID is ABN29D, the student was absent twice (ABSENT2), and the student's name is ABHINAV. Tokens are separated by commas (,).

The second row shows the tokens for the alpha-numeric tokenization method. The third row shows the tokens for the BPE (byte pair encoding) tokenization method. The last row shows the tokens for the exemplary embodiment of the cell-masking tokenization, where an asterisk (*) is used to replace the numbers, and the numbers that have been replaced are also shown. The numbers that have been replaced are kept and used for a numerical frequency, as described below. The numbers may also be used, to an extent, as differentiators (e.g., 29 is different from 25).

It can be seen that the cell-masking tokenization process maintains the jargon-specific features of the input data. That is, the ABN..D of the text is assumed to have some meaning to the school that created the information, and does, as the information corresponds to the student ID. This language is therefore considered to be jargon and is specific to this school. In a broader sense, the jargons-specific features illustrated here can be applied to any trade, profession, manufacturer or similar group, and can be processed to maintain these jargon-specific features via the exemplary cell-masking tokenization process disclosed herein.

For the Cell2Vec module 130, this predicts the target cell using context. Context is selected in order to exploit the tabular structure, and can be considered to be the surrounding words for a target word. For instance, row context may consider all the cell entries in the row of the target cell. Column context may consider the next N column entries from the column of the target cell. The features of Cell2Vec include consideration of all the relevant context (unlike word2vec), and this technique is column-order invariant.

In further detail, Cell2Vec considers the table as a document, each row as a sentence and masked strings as words (see block 315 of FIG. 3), the Cell2Vec model (as part of module 130) can be trained with a vector size of, e.g., 54 bytes, though this vector size is merely one example. Thus, this exploits the tabular structure (e.g., row and column context) to extract semantics among the cell entries. The Cell2Vec model may be based on Word2Vec, trained with all the cell entries in a row treated as context words. That is, the training is performed on the output of the cell-masking modules 120. Word2Vec is described in Tomas Mikolov, Kai Chen, Gregory S. Corrado, and Jeffrey Dean, "Efficient estimation of word representations in vector space", CoRR, abs/1301.3781, 2013. Word2Vec groups together vectors of similar words, and creates estimates of a word's meaning based on the occurrences of the words in the text. These estimates yield word associations with other words in the corpus. For instance, the example previously presented may be used here, where vector (King)−vector (Man)+vector (Woman)=vector (Queen) in this space.

In further detail, in word2vec, training happens on sentences which consist of words. In exemplary embodiments herein, the masked strings (such as ampXXb or JAVXX) are used as words (rather than actual words). Furthermore, the row of a table may be used as a sentence (although the row is not a real sentence). Thus, while the Cell2Vec may be based on word2vec in an exemplary embodiment, implementation details are different.

In block 320, the Cell2Vec module 140 predicts target cells for embedded output (e.g., table 150 of FIG. 1) using context. One example is illustrated by block 322, where the predicting considers row context using all the cell entries in the row of the target cell. Another example is illustrated by block 323, where the predicting considers column context using a next N column entries (that is, entries in the column) relative to the column of the target cell.

In block 324, the Cell2Vec module 140 continues to predict until all target cells have been predicted and the corresponding embeddings of vectors have been made. At this point, a complete output table 150 having embeddings is created.

It is noted that blocks 322 and 323, while they consider all of global features, column features, and row features, are one example. Other examples are possible, as exemplified by block 321. As this block indicates, a vector representation of tabular data may consider the global and local features using one or more of the following:

1) Top K frequent cell entries within a column and row, and this considers global features.

2) M cell entries within the row of the target cell, and this considers local row features.

3) N cell entries in the column of the target cell, and this considers local column features (see also block 323).

In this example, the K, M, and N are at least one but less than all of their corresponding cell entries. These might be set, for instance, by a user either beforehand or dynamically during the flow. All of the cell entries for one or more of these may be considered too, such as instead of the N cell entries in the column of the target cell, all the cell entries in the column would be considered. The "global" features consider some or all of a document, considering both sentences (e.g., in rows) and words (e.g., in columns).

The final embedding vector (of size 64 bytes in an example) is generated by concatenating the numerical component to the Cell2Vec embedding as a numerical frequency encoded vector of size 10 bytes, for 0-9, each byte in this example corresponding to a number of times an associated number has been seen. For example, a byte for zero (0) indicates the number of times the number zero has been seen with respect to the particular token in the cell. See block 325 of FIG. 3. That is, the numerical part (removed by cell-masking) is count-vectorized and concatenated to the previously created cell2vec embeddings. Adding the numerical frequency is not necessary but does provide an accuracy improvement in many situations. These embeddings are then used in the classification network described next.

Concerning the TableNN module 160, tables contain data stored in cells, organized in rows and columns. Cell embeddings have been generated for every cell in the table. As illustrated in FIG. 1, the cell and context embedding 155 are applied to the TableNN 160 module. The terms cell and cell-embedding are used interchangeably, since at this point, the cells contain cell embeddings. In block 330 of FIG. 3, the TableNN module 160, for a cell in the table, extracts a sliced table (i.e., less than all of the table 150 of FIG. 1) containing the cell and adjacent cells. That is, as a further example of block 332, given a cell, $c_{i,j}$, at the $i^{th}$ row and $j^{th}$ column to classify from a table with l rows and m columns, a sliced table $S_{i,k}$ with an additional k rows is extracted. $S_{i,k}=$, $S(S_{i,1,k}, \ldots, S_{i,m,k})$ are ordered sliced columns. Each sliced column is in-turn an ordered collection of cells $S_{i,p,k} = (c_{i,p} \ldots, c_{i+k,p})$, where $p \in (1, \ldots, m)$.

This is illustrated by table 340 (a version of table 150 of FIG. 1), where the $i^{th}$ row of l rows and $j^{th}$ column of m columns are shown. The sliced table 342 includes the $i^{th}$ through $(i+k)^{th}$ rows but only part of the columns (e.g., the sliced part). This is mathematically described above.

Context for cell $c_{i,j}$ is selected from the sliced table $S_{i,k}$. See block 345 of FIG. 3. In an exemplary embodiment, the first row in the sliced table is selected as the row context (see block 350), denoted by $S_i$ for ease of reading, while the $j^{u}i$ column in sliced table $S_{i,j,k}$ is selected as the column context (see block 355). Embodiments are not limited to these selections, however. Concatenation (see block 360) is performed of the row and column context $U^{i,j}=(S_i, S_{i,j,k})$ to form a total context, and the total number of context elements t=m+k. By considering the entire first row in the sliced table as row context, one avoids having to select certain columns. Additionally, contribution of the context elements is learned by the model while training the classifier, making this method column-order invariant.

Cells are to be classified into pre-defined classes 344, and in this document, classes are column headers, although other options are possible. In training, row and column context are obtained from sliced tables for each cell. The cells and corresponding total context are applied to a neural network 366 for training using the pre-defined classes. See block 365. One example of a neural network as a classifier has two hidden layers with 512 and 256 nodes, respectively, and an output layer with modes equal to number of columns in a respective dataset. One such neural network 366 may additionally be a supervised attention-based neural network, training for which is performed in block 370. An example of training the supervised attention-based neural network is described below, but many other types of neural networks may be used. Once the neural network 366 is trained, it becomes a trained neural network 368, and the trained neural network 368 may be used for analysis of other table data, including other tables. See block 375. The outputs of the trained neural network 368 in an exemplary embodiment are class probabilities for the pre-defined classes 344.

For the supervised attention-based neural network, consider the following. To exploit the context while training the classifier (e.g., the NN 366), the contribution of each context element is calculated like so:

$$\omega_t^{i,j}=b+(c_{i,j}U_t^{i,j})W^T \tag{1}$$

where $t=(1, \ldots, m+k)$, $\omega_t^{i,j}$ is the linear transform output for each context element $U_t^{i,j}$ and cell $c_{i,j}$ pair, $W \in \mathbb{R}^{1 \times 2D}$ is the learnable parameter (D is the cell embedding length) and b is the bias.

All t outputs from Equation (1) are then normalized (see Ilya Sutskever, Oriol Vinyals, and Quoc V. Le, "Sequence to sequence learning with neural networks", arXiv:1409.3215, 2014) using a softmax function:

$$\alpha_t^{i,j} = \frac{e^{\omega_t^{i,j}}}{\sum_{k=1}^t e^{\omega_i^{i,j}}}, \tag{2}$$

Contribution of context element $\alpha_t^{i,j}$ is matrix-multiplied with the context element embedding as the following:

$$\zeta^{i,j}=\alpha^{i,j}U^{i,j}, \tag{3}$$

where $\zeta^{i,j} \in \mathbb{R}^D$ is the vector representing the context contribution. $\zeta^{i,j}$ is then concatenated with $c_{i,j}$ and the final output is processed through a fully connected neural network.

$$Y^{i,j}=g^{fc}(b^{fc}+(c_{i,j},\zeta^{i,j})W^{fc}), \tag{4}$$

where $g^{fc}$, $b^{fc}$ and $W^{fc}$ are the activation function (e.g., ReLU, which is a non-linear activation function that is used in multi-layer neural networks or deep neural networks), bias, and learnable weights for the fully connected neural network respectively. Finally, $Y^{i,j}$ is processed through a log softmax function to calculate the class probabilities for the pre-defined classes 344.

What has been shown are new methods for tokenizing and embedding cell entries in tabular data. A new framework is proposed to build a neural network-based model to predict the category of the cells using the context surrounding the cell entries. The proposed Cell-Masking tokenization method along with the Cell2Vec contextual embedding provides the highest performance. Also, attention-based modeling improves the header prediction accuracy significantly.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of using a computing device to generate unique word embeddings for jargon-specific tabular data comprising:
   accessing by the computing device tabular data containing a plurality of entries of alphanumeric data, individual entries comprising one or more strings;
   generating, by the computing device using a tokenization process, a plurality of tokens of the plurality of entries of alphanumeric data, the tokenization process maintaining jargon-specific features of the alphanumeric data by masking a set comprising every individual numerical character in all strings of the plurality of entries of alphanumeric data in the tabular data by replacing the individual numerical characters of the set with an equal size set of individual replacement characters to form masked strings, wherein one or more of the plurality of tokens comprise masked strings that maintain an original sequence of the alphanumeric data while masking one or more characters in the original sequence and keeping other characters in the one or more characters as unchanged;

generating, by the computing device using the tokens, a plurality of embeddings of the plurality of entries of alphanumeric data, the plurality of embeddings capturing similarity of the plurality of entries considering all of global features, column features, and row features in the tokens of the tabular data, and wherein the generating the plurality of embeddings creates an embedded table;

forming a total context by:
  for a cell in the embedded table, extracting a sliced table containing the cell and adjacent cells;
  selecting a row context and a column context for the cell from rows and columns of the sliced table; and
  concatenating the row context and the column context to form the total context;

training a supervised attention-based neural network at least by applying cells, of the embedded table, and corresponding total context to the supervised attention-based neural network using pre-defined classes; and predicting, by the computing device using the supervised attention-based neural network, probabilities for the pre-defined classes for the tabular data using the generated plurality of embeddings.

2. The method of claim 1, where the tabular data is located in a spreadsheet.

3. The method of claim 1, wherein:
the tabular data is considered to have a format comprising:
  the tabular data is considered to be a document;
  rows into which the tabular data is organized are considered to be context; and
  columns into which the tabular data is organized are considered to be one or more words and the tokens have replaced corresponding tabular data in the columns, and
  the generating the plurality of embeddings of the plurality of entries of alphanumeric data uses this format for the tabular data.

4. The method of claim 3, wherein:
the tokenization process stores numerical characters that were replaced during the masking and in association with a corresponding token that had alphanumeric data where masking was performed; and
the generating the plurality of embeddings of the plurality of entries of alphanumeric data comprises:
  predicting target cells for embedded output using context of the rows and columns associated with the target cells to create embeddings for the target cells; and
  generating final embedding vectors for the target cells at least by concatenating the numerical characters to associated previously created embeddings for the target cells as corresponding numerical frequency encoded vectors.

5. The method of claim 4, wherein the numerical frequency encoded vectors have information indicating a number of times an associated number for the token in an associated target cell has been seen, for each of digits zero through nine.

6. The method of claim 4, wherein the predicting target cells for embedded output using context of the rows and columns associated with the target cells to create embeddings for the target cell further comprises considering all cell entries in the row of the target cell and a next N cell entries from the column of the target cell, N being one or more but less than all of the entries in the column.

7. The method of claim 4, wherein the predicting target cells for embedded output using context of the rows and columns associated with the target cells to create embeddings for the target cell further comprises considering one or more of:
  a top K frequent cell entries within a column and a row for the target cell;
  M cell entries within the row of the target cell; or
  N cell entries in the column of the target cell.

8. The method of claim 1, wherein the pre-defined classes are headers of columns in the tabular data.

9. The method of claim 1, wherein selecting context for the cell from rows and columns of the sliced table comprises:
  selecting a first row in the sliced table as the row context; and
  selecting a jth column in the sliced table as the column context.

10. The method of claim 1, wherein:
the tokenization process forms a table of the plurality of tokens; and
the generating, by the computing device using the tokens, the plurality of embeddings identifies the table as a document with each row as a sentence and masked strings as words.

11. A computing device to generate unique word embeddings for jargon-specific tabular data, comprising:
  one or more memories having computer-readable code thereon; and
  one or more processors, the one or more processors, in response to retrieval and execution of the computer-readable code, causing the computing device to perform operations comprising:
    accessing by the computing device tabular data containing a plurality of entries of alphanumeric data, individual entries comprising one or more strings;
    generating, by the computing device using a tokenization process, a plurality of tokens of the plurality of entries of alphanumeric data, the tokenization process maintaining jargon-specific features of the alphanumeric data by masking a set comprising every individual numerical character in all strings of the plurality of entries of alphanumeric data in the tabular data by replacing the individual numerical characters of the set with an equal size set of individual replacement characters to form masked strings, wherein one or more of the plurality of tokens comprise masked strings that maintain an original sequence of the alphanumeric data while masking one or more characters in the original sequence and keeping other characters in the one or more characters as unchanged;
    generating, by the computing device using the tokens, a plurality of embeddings of the plurality of entries of alphanumeric data, the plurality of embeddings capturing similarity of the plurality of entries considering all of global features, column features, and row features in the tokens of the tabular data, and wherein the generating the plurality of embeddings creates an embedded table;
    forming a total context by:
      for a cell in the embedded table, extracting a sliced table containing the cell and adjacent cells;

selecting a row context and a column context for the cell from rows and columns of the sliced table; and concatenating the row context and the column context to form the total context;

training a supervised attention-based neural network at least by applying cells, of the embedded table, and corresponding total context to the supervised attention-based neural network using pre-defined classes; and predicting, by the computing device using the supervised attention-based neural network, probabilities for the pre-defined classes for the tabular data using the generated plurality of embeddings.

12. The computing device of claim 11, wherein:

the tabular data is considered to have a format comprising:

the tabular data is considered to be a document;

rows into which the tabular data is organized are considered to be sentences; and columns into which the tabular data is organized are considered to be words and the tokens have replaced corresponding tabular data in the columns, and the generating the plurality of embeddings of the plurality of entries of alphanumeric data uses this format for the tabular data.

13. The computing device of claim 12, wherein:

the tokenization process stores numerical characters that were replaced during the masking and in association with a corresponding token that had alphanumeric data where masking was performed; and the generating the plurality of embeddings of the plurality of entries of alphanumeric data comprises:

predicting target cells for embedded output using context of the rows and columns associated with the target cells to create embeddings for the target cells; and generating final embedding vectors for the target cells at least by concatenating the numerical characters to associated previously created embeddings for the target cells as corresponding numerical frequency encoded vectors.

14. The computing device of claim 13, wherein the numerical frequency encoded vectors have information indicating a number of times an associated number for the token in an associated target cell has been seen, for each of digits zero through nine.

15. The computing device of claim 13, wherein the predicting target cells for embedded output using context of the rows and columns associated with the target cells to create embeddings for the target cell further comprises considering all cell entries in the row of the target cell and a next N cell entries from the column of the target cell, N being one or more but less than all of the entries in the column.

16. The computing device of claim 13, wherein the predicting target cells for embedded output using context of the rows and columns associated with the target cells to create embeddings for the target cell further comprises considering one or more of:

a top K frequent cell entries within a column and a row for the target cell;

M cell entries within the row of the target cell; or

N cell entries in the column of the target cell.

17. The computing device of claim 11, wherein the pre-defined classes are headers of columns in the tabular data.

18. The computing device of claim 11, wherein selecting context for the cell from rows and columns of the sliced table comprises:

selecting a first row in the sliced table as the row context; and selecting a jth column in the sliced table as the column context.

* * * * *